United States Patent [19]

Dietz

[11] 3,930,890
[45] Jan. 6, 1976

[54] STORAGE BATTERY GAS RECOMBINATION CATALYST DEVICE

[75] Inventor: Hermann Dietz, Gerlingen, Germany

[73] Assignee: Robert Bosch G.m.b.H., Stuttgart, Germany

[22] Filed: May 14, 1974

[21] Appl. No.: 469,779

[30] Foreign Application Priority Data

May 23, 1973 Germany............................ 2326169

[52] U.S. Cl................ 136/179; 136/181; 23/288 R; 252/477 R
[51] Int. Cl.²........................ H01M 2/12; B01J 8/00
[58] Field of Search............ 136/179, 181; 23/288 R; 252/477 R

[56] References Cited
UNITED STATES PATENTS

| | | | |
|---|---|---|---|
| 3,102,059 | 8/1963 | Harmer................ | 136/181 |
| 3,464,860 | 9/1969 | George et al.......... | 136/179 |
| 3,701,691 | 10/1972 | Sassmannshausen et al........ | 136/181 |
| 3,817,717 | 6/1974 | Kreidl et al..................... | 23/288 R |

Primary Examiner—Donald L. Walton
Attorney, Agent, or Firm—Flynn & Frishauf

[57] ABSTRACT

A lightweight catalyst body bearing a finely divided metal of the platinum group is encased in a porous PTFE shell which is impermeable to the electrolyte because of its hydrophobic surface properties. Several small bodies of this kind, each containing about 1 mg of palladium are inserted in each cell of a vehicle storage battery and float on the electrolyte surface. They not only recombine hydrogen and oxygen to water and return the water to the electrolyte efficiently, even at high ambient temperatures, but the efficiency of the catalyst is not reduced under conditions causing considerable generation of stibine. The core material on which the catalyst is provided, with or without an additional carrier, may be activated charcoal, hollow glass spheres, a porous ceramic or a synthetic resin foam. The porous hydrophobic shell may be sintered or unsintered or may be made of superimposed sintered and unsintered layers.

6 Claims, 3 Drawing Figures

STORAGE BATTERY GAS RECOMBINATION CATALYST DEVICE

This invention relates to a device for facilitating the recombination of gases generated in a storage battery by means of a recombination catalyst, and more particularly a device in which the recombination catalyst is enclosed in a porous hydrophobic shell.

In lead-acid batteries and also in other rechargeable batteries, there is a consumption of water as the result of self-discharge, or side reactions during charging, or else by overcharging of the battery. This water consumption causes the level to which the electrolyte fills the battery to drop. If the battery is not regularly refilled with water, it can suffer damage.

It is known to mitigate the water loss of a battery by causing the hydrogen and oxygen produced by decomposition of water to be recombined in the presence of a catalyst. Arrangements providing catalysts of this sort are either provided as stoppers or plugs to be mounted on commercially available batteries or else are arranged as a bed or carrier in the gas space above the electrolyte in specially constructed batteries. The catalyst in such arrangements can be enclosed in porous hydrophobic sheet material.

The arrangements above described have the disadvantage that they are of expensive construction and increase the vertical dimension of the battery. If it is desired to equip a conventional starter battery, for instance, by the addition of a catalyst device, the provision of this device will increase the vertical dimension of the assembled battery, which makes such an expedient unfeasible for many types of vehicles for lack of space.

The greatest problem of all devices of the above-mentioned sort heretofore available is the dissipation of the heat of reaction, which leads to a further disadvantage. The combination of hydrogen and oxygen is a strongly exothermic reaction and heavy generation of these explosive gases can lead to a high operating temperature of the catalyst if there is insufficient removal of heat. In consequence, various types of damage can arise:

1. At temperatures above 150°C. there comes into play the decomposition of antimony hydride (stibine) which is formed by attack of the battery grid alloy. This leads to a deposit of antimony on the hot parts of the catalyst and consequently to an at least partial deactivation or poisoning of the catalyst.
2. If the catalyst is mounted on a holder of synthetic material, thermal damage to the synthetic material can be brought about by insufficient heat removal.
3. If the catalyst is overheated to the ignition temperature of the gas mixture, the result can be an explosion.

The efficiency of devices for gas recombination depends on, among other things, how completely the resulting water vapor can be led back into the electrolyte. Devices in which the recombination catalyst is placed directly in the ventilation opening of a battery cell (stopper form) tend to give off a portion of the resulting water vapor into the surrounding atmosphere, thereby reducing the efficiency of the device.

It is an object of the present invention to provide a device for producing gas recombination that can be utilized in any commercially available storage battery without in any way increasing the dimensions of the battery and without giving rise to any danger of overheating of the catalyst and all of the undesirable consequences thereof mentioned above. It is a further object of the invention that such a device should have a high efficiency and that therefore the water produced by recombination should be reintroduced into the electrolyte space as completely as possible. Finally, it is a still further object of the invention that the recombination device should be of low cost and should be operable with as small quantities of catalyst as possible.

SUBJECT MATTER OF THE PRESENT INVENTION:

Briefly, the device is provided in the form of a body having dimensions and constitution such that a number of them can float freely on the electrolyte of a storage battery, the specific weight of these bodies being smaller than the specific weight of the electrolyte when the battery is in its lowest charged condition. This floating capability can be assured if the specific weight of the body of such a floating device as a whole is smaller than 1 g/cm$^3$. The inner portion of the individual device bodies consists of a material having or provided with a large proportion of void space and a small bulk density, this material either serving as a carrier for the catalyst or being provided as an addition to the catalyst to assure floatation. Suitable materials for these purposes are activated carbon, hollow glass spherical particles, porous ceramic materials and porous organic materials such as foamed polystyrene.

The maximum size of the catalyst-containing bodies of the present invention is determined by the space available on the surface of the electrolyte of a battery and by the clearance of the openings in the battery case for filling the battery with electrolyte. It has been found advantageous to select dimensions for the catalyst bodies in the region of 1–10 mm. and preferably the range from 2–6 mm. They may be spherical, lens-shaped or of any other outer shape that may appear suitable. The use of a number of such small bodies in a battery has the advantage that local heat concentration is avoided and, furthermore, the large surface and the direct contact of the bodies with the electrolyte provide for effective dissipation of heat. Furthermore, the subdivision of the recombination catalyst material into a number of bodies provides a more effective modification of the battery behavior and a good possibility of adjusting the remedial action to the maximum overcharge current of the particular case. Experiments have shown that a catalyst body with 1 mg of palladium as active material on 50 mg of charcoal is sufficient to recombine the amount of hydrogen and oxygen produced by a current of about 100 mA. A 45 ampere-hour starter battery under normal operation conditions requires about three to five catalyst bodies per cell, each with 1 mg of palladium.

The invention is further described by way of example, including the manner of manufacture, with reference to the accompanying drawings, in which.

Figure 1:
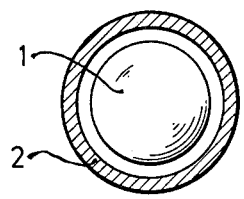
FIG. 1 is a cross-section of one form of device in accordance with the invention.

The catalyst body shown in FIG. 1 is of spherical shape, having a diameter of about 5 mm. It consists of a core 1 having a specific weight smaller than 1, which may for example be of activated charcoal, on which the catalyst material, for example, a finely divided metal of the platinum group, such as palladium or platinum itself, has been precipitated. This core is surrounded in a water-tight fashion by a porous sintered sheet or layer 2 of polytetrafluoroethylene (PTFE), which is water-tight in spite of being porous and permeable to gas because of its hydrophobic surface characteristic.

Figure 2:
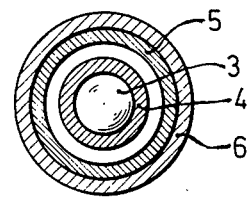
FIG. 2 is a cross-section of another form of the device according to the invention.

The form of device according to the invention shown in FIG. 2 is provided with a float body 3 consisting of a hollow glass sphere or a sphere of polystyrene foam. On the surface of this float body is spread the catalyst material 4, with or without a carrier. The core composed of the float body 3 and the catalyst material 4 is enclosed in a skin or foil composed of two layers, an inner layer 5 of unsintered PTFE and an outer layer 6 of sintered PTFE. Because of the surface properties of PTFE, this skin is impermeable to liquids, particularly aqueous liquids.

Figure 3:
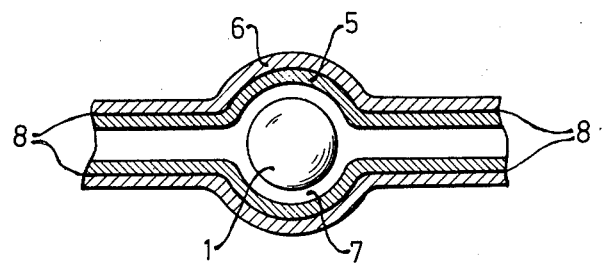
FIG. 3 is a cross-section of an incompletely manufactured catalyst body device according to the invention for explaining one illustrative method of making the device.

The manufacture of the device of FIG. 3 utilizes a double layer PTFE foil as a starting material. The inner layer 5 again consists of unsintered PTFE and the outer layer 6 of sintered PTFE. The manufacture of such foil materials is described in detail in published German Pat. application (OS) No. 2,115,619. A flat foil of this kind is first deformed by pressing hemispherical depressions 7 in the foil, leaving a plane edge fringe 8 around a depression so formed.

The catalytically active core 1 is made by impregnating activated charcoal with a palladium chloride solution in a known way, filtering out the activated charcoal from the solution and then reducing the palladium chloride adsorbed on the charcoal to palladium metal with hydrazine solution. The catalyst-carrier mass thus produced can be used either in this form or else in a granulated or spherical form obtained with the help of pulverized PTFE or by agglomeration with water, the granular or spherical form serving to facilitate the filling of the hemispherical shells with the catalyst-bearing cores.

After the catalyst-bearing mass thus prepared forming the core 1 is placed in a hemispherical shell 7, a second hemispherical shell is placed over it and the two shell pieces are pressed together at their plane edges 8 by a correspondingly shaped tool. The edges 8 are thereafter trimmed and the device thus completed may, if desired, then be sintered again at a temperature of about 327°C.

These floating catalyst capsules can now be simply introduced into each shell of the battery through the fill opening for the electrolyte. The necessary number of them needed for each shell depends, as already explained, from the battery characteristics, particularly the maximum overcharge current to which the particular battery is subject.

It has surprisingly been found that the catalyst device according to this invention can be used for several thousand hours of operation without any falling off of the recombination capability becoming noticeable, even in the case of a heavy evolution of stibine (antimony hydride), this having been established in experiments in which batteries with grids of large antimony content were overcharged. It is accordingly not necessary, in the case of the catalyst devices of the present invention, to provide on the core of the device itself a layer capable of combining with stibine as is the case in other recombination devices.

The catalyst device of the present invention has the advantage that the types of damage above-described do not take place, because overheating is prevented by the direct contact with the electrolyte. In particular, the distribution of the active material into several small catalyst bodies prevents heat concentration and local heat accumulation, and the large resulting contact surface favors heat removal.

The provision of the catalyst bodies in the immediate neighborhood of the electrolyte surface largely prevents the escape of water vapor through the ventilation openings, so that these devices are significantly more effective than catalyst devices arranged far above the electrolyte surface, or even outside the battery case. When the catalyst device is well above the surface of the electrolyte, relatively high vaporization losses of the recombined water take place. When the devices of the present invention are used, on the contrary, it has been found that even at elevated exterior temperatures up to 80°C., the efficiency of the catalyst is not reduced.

I claim:

1. A device for promoting catalytic recombination of gases generated in a storage battery, comprising a catalyst body encased in a porous hydrophobic shell consisting of superposed layers respectively of sintered and unsintered polytetrafluoroethylene, said body being of such dimensions and constitution that a multiplicity of said bodies may float freely on the electrolyte of a storage battery and that the specific weight of the device as a whole is less than the specific weight of the electrolyte in its condition of lowest battery charge, said catalyst body being constituted largely of a material having a high proportion of void space in its interior and a low bulk density and serving as a carrier for a finally divided catalyst material.

2. A device as defined in claim 1 in which the specific weight of the device as a whole is smaller than 1 g/cm$^3$.

3. A device as defined in claim 1 in which said material of which said catalyst body is largely constituted is activated charcoal.

4. A device as defined in claim 1 in which said hydrophobic shell consists of an inner layer of unsintered polytetrafluoroethylene and an outer layer of sintered polytetrafluoroethylene.

5. A device as defined in claim 1 in which said material of which said catalyst body is largely constituted consists of hollow glass spherical particles.

6. A device as defined in claim 1 in which said material of which said catalyst body is largely constituted is a foamed synthetic resin.

* * * * *